United States Patent [19]
Dosoudil

[11] Patent Number: 5,362,403
[45] Date of Patent: Nov. 8, 1994

[54] FILTRATION APPARATUS AND METHOD FOR DISCHARGING FILTER CAKE FROM A FILTRATION APPARATUS

[76] Inventor: Martin Dosoudil, Kwakelkade 28, NL-1800 AJ Alkmaar, Netherlands

[21] Appl. No.: 861,975
[22] PCT Filed: Dec. 21, 1990
[86] PCT No.: PCT/NL90/00184
§ 371 Date: Aug. 31, 1992
§ 102(e) Date: Aug. 31, 1992
[87] PCT Pub. No.: WO91/09661
PCT Pub. Date: Jul. 11, 1991

[30] Foreign Application Priority Data

Dec. 29, 1989 [NL] Netherlands ............... 8903177

[51] Int. Cl.$^5$ .................................... B01D 25/32
[52] U.S. Cl. ............................ 210/744; 210/791;
210/106; 210/112; 210/143; 210/407
[58] Field of Search ............... 210/744, 746, 791, 104,
210/106, 112, 143, 407, 413

[56] References Cited

U.S. PATENT DOCUMENTS

| | | | |
|---|---|---|---|
| 3,230,865 | 1/1966 | Hibbel et al. | 210/415 |
| 3,943,033 | 3/1976 | Wallen | 210/417 |
| 4,287,058 | 9/1981 | Larsen | 210/112 |
| 4,810,373 | 3/1989 | Rice | 210/112 |

FOREIGN PATENT DOCUMENTS 8005787 5/1982 Netherlands .

*Primary Examiner*—Peter A. Hruskoci
*Attorney, Agent, or Firm*—Spencer, Frank & Schneider

[57] ABSTRACT

A filtration apparatus and a method for discharging filter cake from a filtration vessel of the filtration apparatus, the method including loosening filter cake from filter elements of a filtration vessel; conveying the loosened filter cake from the filter vessel towards a discharge shaft, which discharge shaft is in pressure communication with the filter vessel, is vertically disposed, and includes a bottom end having closure means; sensing the height of the filter cake within the discharge shaft; and cyclically opening and closing the closure means thereby discharging the filter cake by pressing or blowing out the filter cake due to the pressure within discharge shaft, the closure means being opened for a period of open time in response to sensing a selected maximum height of filter cake within the discharge shaft whereafter the closure means is closed automatically.

6 Claims, 1 Drawing Sheet

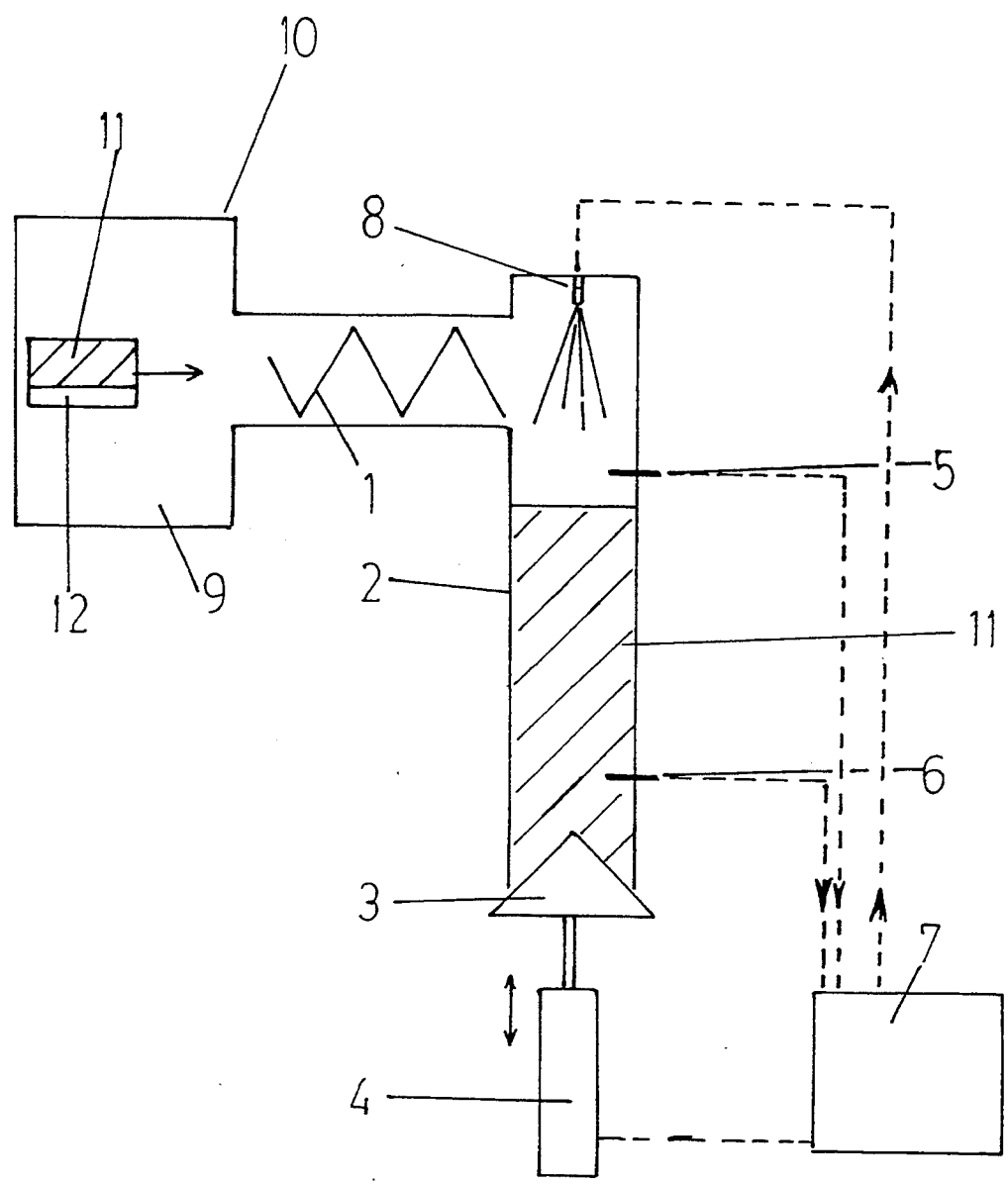

FILTRATION APPARATUS AND METHOD FOR DISCHARGING FILTER CAKE FROM A FILTRATION APPARATUS

BACKGROUND OF THE INVENTION

1. Field of the Invention

The invention relates to a method and device for a discharge of a filter cake, loosened from filtration elements, out of a filter vessel of a filter apparatus, more particularly, out of a high pressure continuous filter device.

2. Description of the Related Art

Such a method and device is known, in which a loosened filter cake is discharged from an over-pressured filter vessel by means of two conveyor screws which adjoining each other at an angle of 90 degrees. The second conveyor screw, which debouches out of the filter vessel, along with the more or less compressed filter cake forms a closure between the inner-side and the outer-side of the filter vessel while under pressure, so that only the filter cake will be transported outside by the second conveyor screw and no pressure-loss will occur in the filter vessel itself.

This known method has the drawback that, with certain types of cake compositions, the cake in the second conveyor screw no longer is transported outside, but starts to turn along with the conveyor screw.

Also in this known method and device, certain types of cake composition generate an inadmissibly high wearing of the blades of the conveyor screws, causing the necessity to replace them quickly and repeatedly.

The invention aims to obviate the drawbacks of the known method and apparatus for discharge of a filter cake, loosened from filter elements, out of a filter vessel of a filter apparatus, more particularly, out of a high pressure continuous filter apparatus.

SUMMARY OF THE INVENTION

The method according to the invention is characterized in that the filter cake is conveyed towards a discharge shaft, to fall down into it, and when the cake reaches a certain height within the shaft, the shaft is opened near or at the bottom end, and the filter cake is pushed or blown out of the shaft by the over-pressure in the filter vessel.

By applying the method according to the invention, the filter cake is continuously conveyed out of the filter vessel towards the discharge shaft, the shaft opens and closes periodically to periodically press or blow away the cake, collected within the shaft, out of the shaft.

The pressing or blowing away of the filter cake out of the shaft may take place completely without any disturbances and, by the expansion of gas or air, present within the space between the cake elements in the shaft during the pressing or blowing away of the cake from out of the shaft, the cake elements are caused to be loosened from each other and from the wall of the shaft in a favourable manner.

The filter cake loosened from the filter elements may be conveyed towards the discharge shaft in various ways.

According to a characteristic of the method according to the invention, the filter cake is conveyed towards the shaft by means of a conveyor screw.

During the pressing or blowing away of the cake from out of the shaft it is inevitable, that along with the cake a part of the air- or gas-content of the filter vessel is discharged along with the filter cake to the outside and causing the occurrence of a certain pressure-loss within the filter vessel.

In order to reduce this pressure-loss to a minimum during the pressing or blowing away of the filter cake from out of the discharge shaft, the method according to the invention is further characterized in that the cake is sealed with a powder-shaped or viscous means, e.g. a viscous oil, before the cake is pressed or blown away out of the shaft.

The sealing means may be put into the shaft in various ways. Thus, the sealing means may be pressed into the shaft by means of a plunger.

The periodical opening and closing of the discharge of the shaft may take place in various ways.

In a favourable way according to a further characteristic of the method according to the invention, the opening and closing of the discharge of the shaft takes place automatically, and more in particular under the control of one or more sensors, placed within the shaft.

Thus, a high level sensor may be present, which may be activated when the cake in the shaft reached a maximum height, and a low level sensor, which is activated when the cake in the shaft drops down to or below this low level sensor.

In a favourable embodiment of the invented method, when the cake in the shaft reaches a certain maximum height, the discharge is opened for a certain period of time.

This period of time for the opening of the discharge may efficiently be adjustable in dependence upon the nature of the cake to be removed from out of the shaft.

In a preferred embodiment of the invented method the opening time of the opening cyclus is increased or decreased with a certain time interval depending on either the not-reaching or the exceeding of a certain preferred minimum height of the cake within the shaft. Thus, in this embodiment of the invented method an automatic adaptation to the nature of the cake to be discharged, occurs.

In a favourable way in a further working out of the method according to the invention, the opening of the discharge is controlled by a high level sensor and the increasing or decreasing of the opening time with the time interval is controlled by a low level sensor.

Thus, in this embodiment of the invented method the opening time may fluctuate around a certain average value and in the same way the height of the cake at the low level may fluctuate around a certain average minimum value.

In a further working out of the invented method, in order to prevent the cake from remaining hanging in the shaft, the outlet of the discharge is increased at a following opening cyclus, with, at the high level sensor remaining activated during a certain period of time.

The apparatus for applying the invented method consists of a filter apparatus more in particular a high pressure continuous filter apparatus, with a filter vessel provided with conveyor means, more in particular a conveyor screw, by which the filter cake, loosened from the filter elements, may be discharged out of the filter vessel, the apparatus being characterized in that the conveyor means connect onto a discharge shaft, which has been provided at or near its bottom end with a closing means, in such a way, that when the filter cake reaches a certain height within the discharge shaft, it is opened, and the cake is pressed or blown out of the shaft by the over-pressure in the filter vessel.

In a favourable embodiment of the apparatus according to the invention the shaft extends widens conically towards the bottom end. By this measure is achieved that the cake within the shaft is loosened from the shaft wall during the pressing or blowing away from out of the shaft, and the discharge of the cake from out of the shaft facilitated.

In a further embodiment of the invented apparatus, the shaft is provided with one or more sensors, such as electrodes, by which the height of the cake within the shaft may be determined and the closing means of the shaft may be controlled. The electrodes may be positioned within the shaft at various heights in respect to one another, such, that when two electrodes which are positioned above one another both engage the filter cake, it causes an electrical closure between both the electrodes, and by which, by means of a known controlling device, the closing means of the shaft may be opened temporarily for the discharge of the filter cake outside the filter apparatus.

For sealing the upper side of the cake, according to a last feature of the invented apparatus, the shaft is provided with one or more inlet openings, through which a sealing means for sealing off the openings in the cake or the openings between the cake elements, such as a viscous oil, may be applied onto the upper side of the cake before it will be pressed or blown away out of the shaft.

BRIEF DESCRIPTION OF THE DRAWING

The sole drawing figure schematically illustrates an embodiment according to the invention of a device for discharging filter cake from a filtration apparatus.

DESCRIPTION OF THE PREFERRED EMBODIMENT

The invention will now be explained with reference to the drawing of an example of an embodiment.

As is shown in FIG. 1, by means of conveyor screw 1, which extends towards a filter vessel 9 which is shown schematically in drawing, filter cake loosened from the filter elements 12 of the filter vessel 9 of a filtration apparatus shown generally at 10 is conveyed towards a discharge shaft 2, which, at its bottom end, is provided with a sluice 3, which is controllable by means of an hydraulic cylinder 4. Within discharge shaft 2, two scanning electrodes 5 and 6 are positioned such that when filter cake 11 forms an electrical closure between electrodes 5 and 6 by reaching a certain height within discharge shaft 2, controlling device 7 shortly opens up sluice 3 and causes the filter cake 11 to be pressed or blown out of the shaft by over-pressure in the filter vessel 9. Before the opening of the sluice 3, a sealing means may be brought onto the filter cake 11 within discharge shaft 2, to minimize the pressure-loss within the filter vessel 9 which occurs at the emptying of discharge shaft 2.

The injection of a sealing means through an inlet opening 8 provided at the top of discharge shaft 2 may be controlled by controlling device 7 which is a device known in the art.

What is claimed is:

1. A method for discharging filter cake from a filtration vessel of a filtration apparatus, comprising:
   a. loosening filter cake from filter elements of a filtration vessel;
   b. conveying the loosened filter cake from the filtration vessel towards a discharge shaft, which discharge shaft is in pressure communication with the filtration vessel, is vertically disposed, and includes a bottom end having closure means;
   c. sensing height of the filter cake within the discharge shaft by sensing means comprising a maximum height sensor for sensing a selected maximum height of filter cake within the discharge shaft, a minimum height sensor for sensing a selected minimum height of filter cake within the discharge shaft, and a controlling device; and
   d. cyclically opening and closing the closure means thereby discharging the filter cake by pressing or blowing out the filter cake due to the pressure within the discharge shaft, the maximum height sensor sensing when the selected maximum height of the filter cake is reached and controlling the opening of the closure means for a selected period of open time whereafter the closure means is closed, and the minimum height sensor sensing when the selected minimum height of filter cake is reached or not reached and continuously controlling an increase or decrease, respectively, of the selected period of open time by a fixed time interval.

2. The method according to claim 1, wherein, when the closure means remains open for a selected period of open time, the period of open time is increased for a subsequent cycle.

3. The method according to claim 1, wherein the filtration apparatus is a high pressure, continuous filtration apparatus and the filtration vessel is pressurized.

4. A high pressure, continuous filtration apparatus, comprising:
   a. a filtration vessel including filter elements upon which a filter cake collects during high pressure filtration and a discharge opening;
   b. a discharge shaft which is in pressure communication with the discharge opening of the filtration vessel, which is vertically disposed, which has a bottom end provided with a closure means, and which includes sensor means comprising a maximum height sensor for sensing a selected maximum height of filter cake within the discharge shaft, a minimum height sensor for sensing a selected minimum height of filter cake within the discharge shaft, and a controlling device; and
   c. conveyor means for conveying loosened filter cake from the discharge opening of the filtration vessel to the discharge shaft,
   wherein the closure means at the bottom end of the discharge shaft is cyclically opened and closed to discharge the filter cake contained therein in response to the sensing means, the maximum height sensor sensing when the selected height of the filter cake is reached and including means for controlling the opening of the closure means for a selected period of open time wherein the filter cake is pressed or blown out of the discharge shaft by the pressure within the filtration apparatus, and whereafter the closure means is closed, and the minimum height sensor sensing when the selected minimum height of filter cake is reached or not reached and including means for continuously controlling an increase or decrease, respectively, of the selected period of open time by a fixed time interval.

5. The high pressure, continuous filtration apparatus according to claim 4, wherein the maximum and minimum height sensors are electrodes, and wherein, when the maximum height sensor causes the closure means to remain open for a selected period of open time, the period of open time is increased for a subsequent cycle.

6. The high pressure, continuous filtration apparatus according to claim 4, wherein the maximum height sensor and the minimum height sensor are electrodes.

* * * * *